United States Patent
Kamiyama et al.

(10) Patent No.: US 7,516,781 B2
(45) Date of Patent: Apr. 14, 2009

(54) PLATE-LIKE HEAT EXCHANGER

(75) Inventors: Naohisa Kamiyama, Ashikaga (JP); Osamu Ito, Chigasaki (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 11/262,972

(22) Filed: Nov. 1, 2005

(65) Prior Publication Data
US 2006/0090886 A1 May 4, 2006

(30) Foreign Application Priority Data
Nov. 2, 2004 (JP) .......................... P2004-319237

(51) Int. Cl.
*F28F 3/12* (2006.01)
(52) U.S. Cl. ....................... 165/170; 165/168
(58) Field of Classification Search .............. 165/168, 165/170
See application file for complete search history.

(56) References Cited

U.S. PATENT DOCUMENTS

| | | | | | |
|---|---|---|---|---|---|
| 1,049,695 | A | * | 1/1913 | Garrison | ................ 237/12.3 A |
| 2,021,995 | A | * | 11/1935 | Heath | ........................... 62/523 |
| 2,039,593 | A | * | 5/1936 | Hubbuch et al. | ............ 165/170 |
| 2,200,426 | A | * | 5/1940 | Lehman | ........................ 165/170 |
| 2,554,185 | A | * | 5/1951 | Giegerich | .................... 165/170 |
| 3,648,665 | A | * | 3/1972 | Ware | ........................... 122/4 R |
| 4,662,561 | A | * | 5/1987 | Dietzsch et al. | ........... 237/12.3 B |
| 5,318,114 | A | | 6/1994 | Sasaki | |
| 2002/0079095 | A1 | * | 6/2002 | Davies et al. | ................ 165/170 |
| 2004/0238162 | A1 | * | 12/2004 | Seiler et al. | .................. 165/148 |

FOREIGN PATENT DOCUMENTS

| | | | |
|---|---|---|---|
| DE | 3422684 A1 | * | 12/1985 |
| JP | 2003-161547 A | | 6/2003 |
| WO | WO 01/90658 A1 | | 11/2001 |

* cited by examiner

*Primary Examiner*—Allen J Flanigan
(74) *Attorney, Agent, or Firm*—Foley & Lardner LLP

(57) ABSTRACT

A plate-like heat exchanger is provided with a plate-like structure; one or more flow paths respectively including opened ends, the flow paths being formed in an interior of the plate-like structure and running in a first direction; one or more covering members fixed to the plate-like structure, at least one end of the covering members extending to reach any one or more peripheries of the plate-like structure; one or more crossing flow paths defined by the covering members and the plate-like structure, the crossing flow paths being directed to a second direction intersecting the first direction and respectively being linked with the opened ends of the flow paths; and inflow and outflow ports respectively for inflow and outflow of a fluid, the ports respectively being formed at the ends of the covering members at the peripheries of the plate-like structure and linked with the crossing flow paths.

6 Claims, 6 Drawing Sheets

FIG. 7

PLATE-LIKE HEAT EXCHANGER

BACKGROUND OF THE INVENTION

1. Field of the Invention

The present invention relates to a plate-like heat exchanger.

2. Description of the Related Art

Heat exchangers are used for various purposes such as heat exchanging in an air-conditioner. In certain cases, the heat exchangers need to be formed in a thin shape.

Japanese Patent Application Laid-open No. 2003-161547 discloses an art providing a heat exchanger formed in a relatively thin shape. In this art, a hollow plate portion is formed at a center of a housing to be used as a flow path for flow of coolant. Both ends of the housing are used as a tank for pooling the coolant.

SUMMARY OF THE INVENTION

Prior arts such as the aforementioned art had limit in downsizing with respect to thickness of the heat exchangers. The present invention is intended for providing a plate-like heat exchanger.

According to an aspect of the present invention, a plate-like heat exchanger is provided with a plate-like structure; one or more flow paths respectively including opened ends, the flow paths being formed in an interior of the plate-like structure and running in a first direction; one or more covering members fixed to the plate-like structure, at least one end of the covering members extending to reach any one or more peripheries of the plate-like structure; one or more crossing flow paths defined by the covering members and the plate-like structure, the crossing flow paths being directed to a second direction intersecting the first direction and respectively being linked with the opened ends of the flow paths; and inflow and outflow ports respectively for inflow and outflow of a fluid, the ports respectively being formed at the ends of the covering members at the peripheries of the plate-like structure and linked with the crossing flow paths.

Preferably, the plate-like structure comprises three plate bodies accumulated with each other and the flow paths are formed between the plate bodies.

Preferably, the plate-like structure comprises three or more plate bodies accumulated one on one and the flow paths are formed at respective interfaces of the plate bodies. More preferably, the inflow port is linked with all the flow paths formed at the respective interfaces so that the fluid is branched to flow all the flow paths.

More preferably, the plate bodies and the covering members are joined with each other by diffusion bonding.

Further preferably, the crossing flow path are formed to have a cross-sectional area greater than a cross-sectional area of the inflow port.

DETAILED DESCRIPTION OF THE PREFERRED EMBODIMENT

An embodiment of the present invention, which will be described hereinafter, achieves the purpose of provision of a plate-like heat exchanger by forming plural flow paths in a plate-like structure having a predetermined thickness, forming crossing flow paths at both ends of the flow paths perpendicularly thereto, tightly closing the crossing flow paths with covering members accumulated on the plate-like structure and directed along a lateral direction of the plate-like structure; extending the crossing flow paths in part to reach peripheries of the plate-like structure; and forming inflow and outflow ports at the extended crossing flow paths. The embodiment of the present invention will be described hereinafter with reference to FIGS. 1 through 7.

Figure 1:
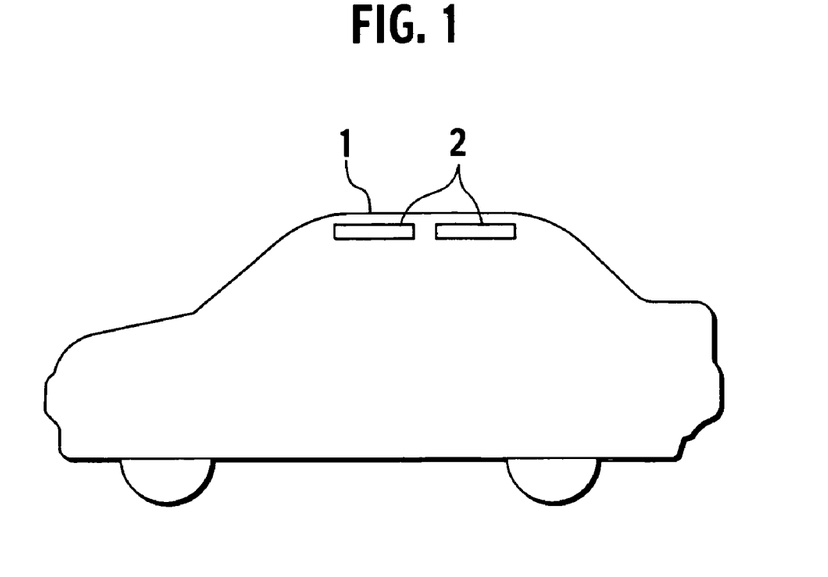
FIG. 1 is a schematically shown cross sectional view of a vehicle having a plate-like heat exchanger installed in a roof thereof.
Figure 2:
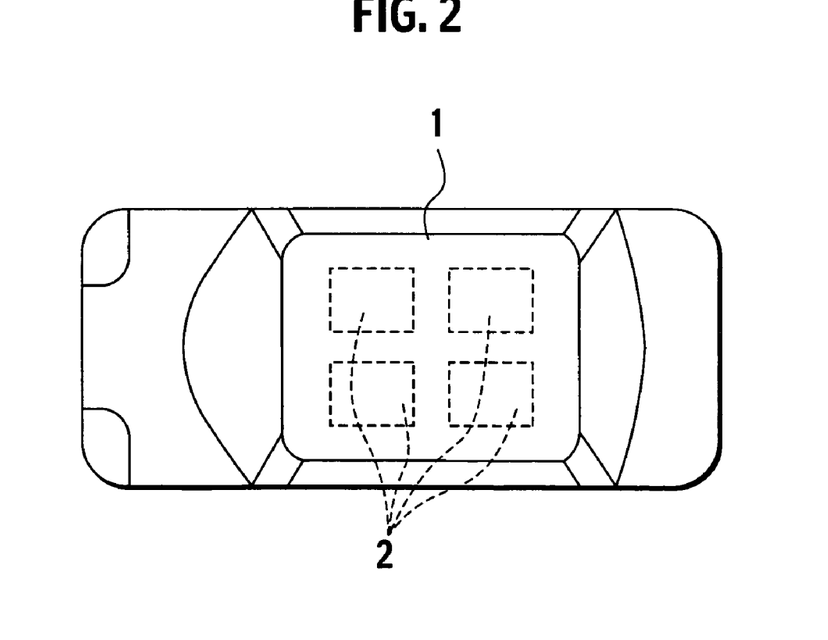
FIG. 2 is a schematically shown top view of the vehicle.
Figure 3:
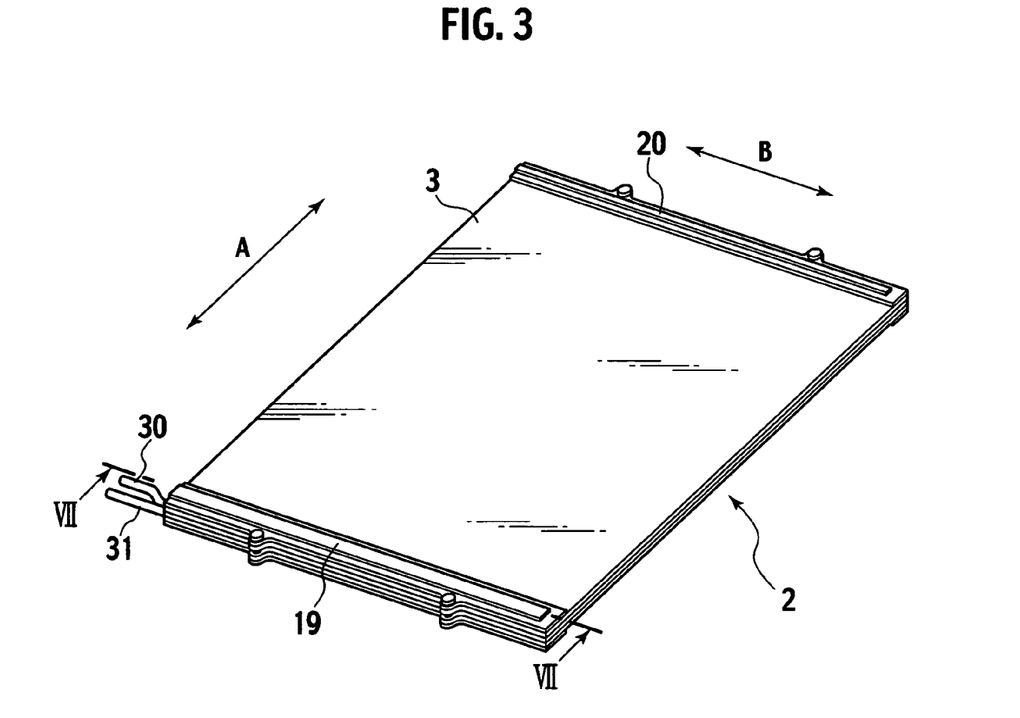
FIG. 3 is a perspective view of a plate-like heat exchanger in accordance with an embodiment of the present invention.

A plate-like heat exchanger 2 in accordance with the present embodiment may be applied to a vehicle in a manner shown in FIGS. 1 and 2. Four plates of the plate-like heat exchangers 2 are installed in a roof of the vehicle so as to be leveled with the ground and arranged side by side, for example. The plate-like heat exchangers 2 are specially installed therein as being separated from the other members of the air-conditioner installed in the vehicle compartment for the purpose of reducing thermal load by thermal insulation at the roof and accomplishing face air-conditioning by radiation at the roof.

The plate-like heat exchangers 2 have a common constitution and FIGS. 3 through 7 illustrate one of them to show the structure thereof. The plate-like heat exchanger 2 is formed to be of a rectangle. A first direction A is defined to be a longitudinal direction of the rectangle and a refrigerant fluid R flows in the first direction A. A second direction B is defined as a direction crossing to the first direction A. As shown in FIG. 4A, the plate-like heat exchanger 2 is provided with an upper plate body 3, a central plate body 4 and a lower plate body 5, all of which are made of a metal.

Reference is now made to FIGS. 4A through 5C, a margin along one end of the upper plate body 3 is cut out along the second direction B to form a first crossing flow path 6. The first crossing flow path 6 spans a half of the upper plate body 3 in a lateral direction and is drawn to one side of the upper plate body 3. The margin of the upper plate body 3 is further cut out along the first crossing flow path 6 and nearer to the end of the upper plate body 3 to form an auxiliary flow path 7, which has substantially the same length as the first crossing flow path 6.

The first crossing flow path 6 is extended to the side of the upper plate body 3 and, there, a side margin of the upper plate body 3 is cut out to form an inflow port 8. Similarly, an outflow port 9 is formed at the side margin to correspond to the auxiliary flow path 7.

A margin along another end of the upper plate body 3 is likewise cut out to form a second crossing flow path 10 though the second crossing flow path 10 substantially extends from one side to another side of the upper plate body 3 differently from the first crossing flow path 6. A third crossing flow path 11 is formed on an extension of the auxiliary flow path 7 at the remaining half of the upper plate body 3. The first crossing flow path 6, the auxiliary flow path 7, the second crossing flow path 10, the third crossing flow path 11 and any equivalents have bridge portions 12 bridging the respective flow paths in these lateral directions for preventing deformation thereof.

Figure 5A:
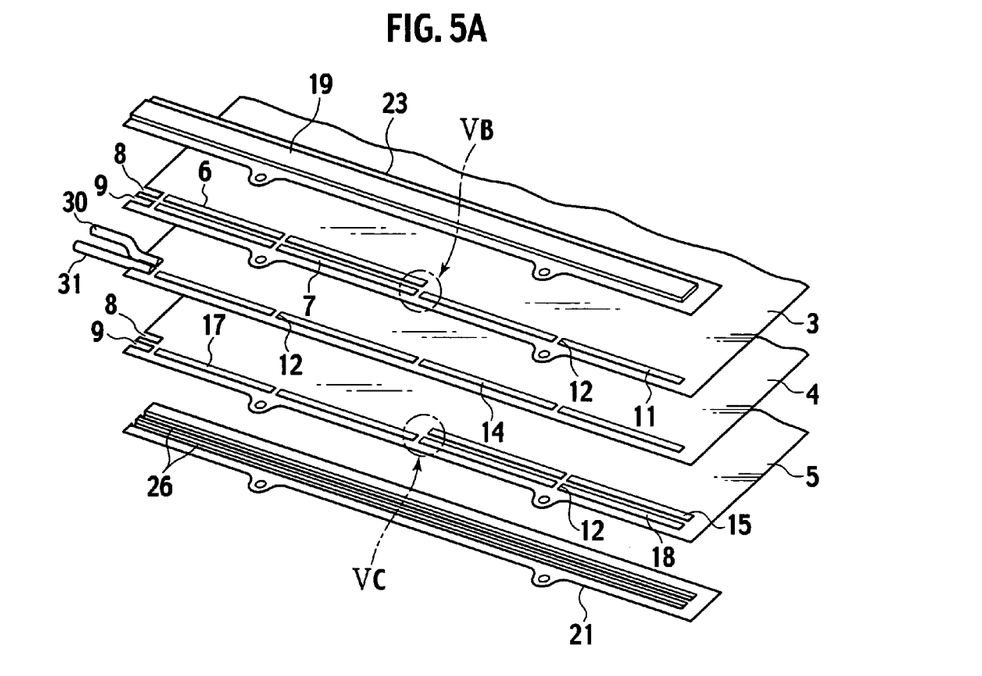
FIG. 5A is an exploded perspective partial view showing one end of the plate-like heat exchanger.
Figure 5B:
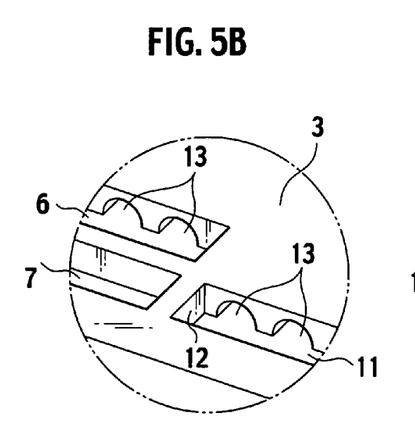
FIGS. 5B and 5C are enlarged perspective partial view of plates composing the plate-like heat exchanger, respectively taken from circles referred as VB and VC in FIG. 5A.

Referring to FIG. 5B in particular, on one face of the upper plate body 4, which faces the central plate body 4, between the first crossing flow path 6 and the second crossing flow path 10, as well as between the second crossing flow path 10 and the third crossing flow path 11, plural grooves are carved along the first direction A to respectively form flow paths 13. The ends of the flow paths 13 are opened to the first crossing flow path 6, the second crossing flow path 10 and the third crossing flow path 11 though not opened to the auxiliary flow path 7.

The central plate body 4 is also cut out correspondingly to the auxiliary flow path 7 and the third crossing flow path 11 to form an auxiliary flow path 14. The opposite end of the central plate body 4 has no flow paths. The auxiliary flow path 14 is extended to one side of the central plate body 4 and, there, a side margin of the central plate body 4 is cut out. The cut out portion is to compose the inflow port 8. Adjacent thereto, further the central plate body 4 is cut out to compose the outflow port 9. Except for the auxiliary flow path 14 and the cut out portions, the central plate body 4 is formed to be flat and do not have any recesses and cuttings.

The lower plate body 5 is somewhat similar to the upper plate body 3, however, a fourth crossing flow path 15 is formed at an opposite half of the lower plate body 5 as compared with the first crossing flow path 6 of the upper plate body 3. A fifth crossing flow path 16 is formed at an opposite end of the lower plate body 5 correspondingly to the second crossing flow path 10 of the upper plate body 3. A sixth flow path 17 is formed on the lower plate body 5 correspondingly to the auxiliary flow path 7 of the upper plate body 3. An auxiliary flow path 18 of the lower plate body 5 is formed on an extension of the sixth crossing flow path 17 at the remaining half of the lower plate body 5. The sixth crossing flow path 17 is extended to the side of the lower plate body 5 and, there, a side margin of the lower plate body 5 is cut out to compose the outflow port 9. Adjacent thereto, further the lower plate body 5 is cut out to compose the inflow port 8.

Figure 5C:
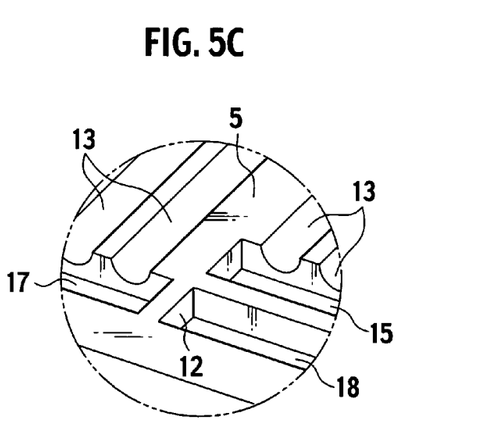
Figure 6:
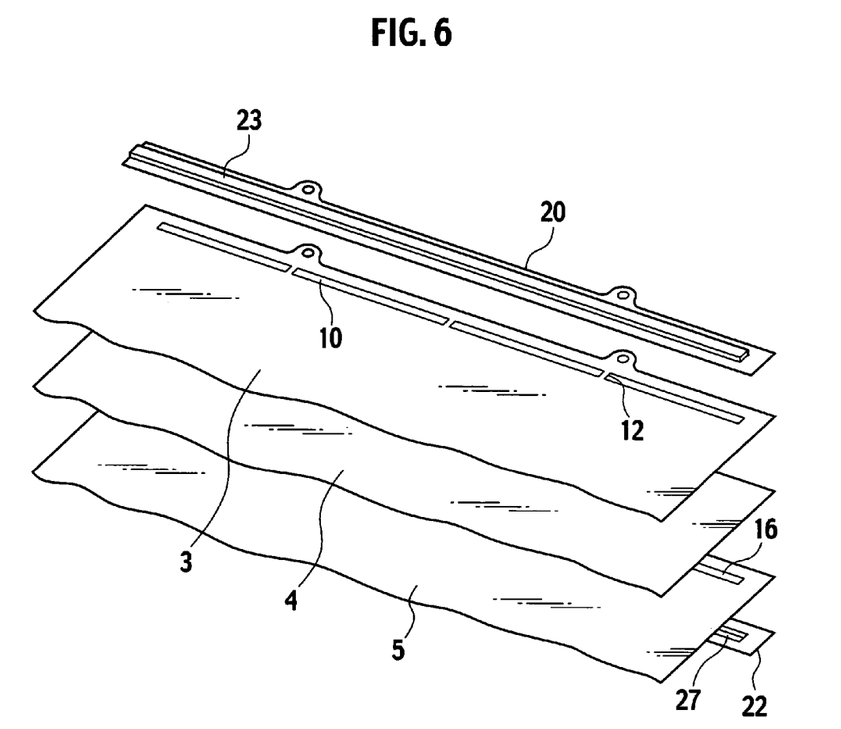
FIG. 6 is an exploded perspective partial view showing another end of the plate-like heat exchanger.

Referring to FIG. 5C in particular, on one face of the lower plate body 5, which faces the central plate body 4, between the fourth crossing flow path 15 and the fifth crossing flow path 16, as well as between the fifth crossing flow path 16 and the sixth crossing flow path 17, plural grooves are carved along the first direction A to respectively form flow paths 13. The ends of the flow paths 13 are opened to the fourth crossing flow path 15, the fifth crossing flow path 16 and the sixth crossing flow path 17 though not opened to the auxiliary flow path 18.

Figures 4A, 4B:
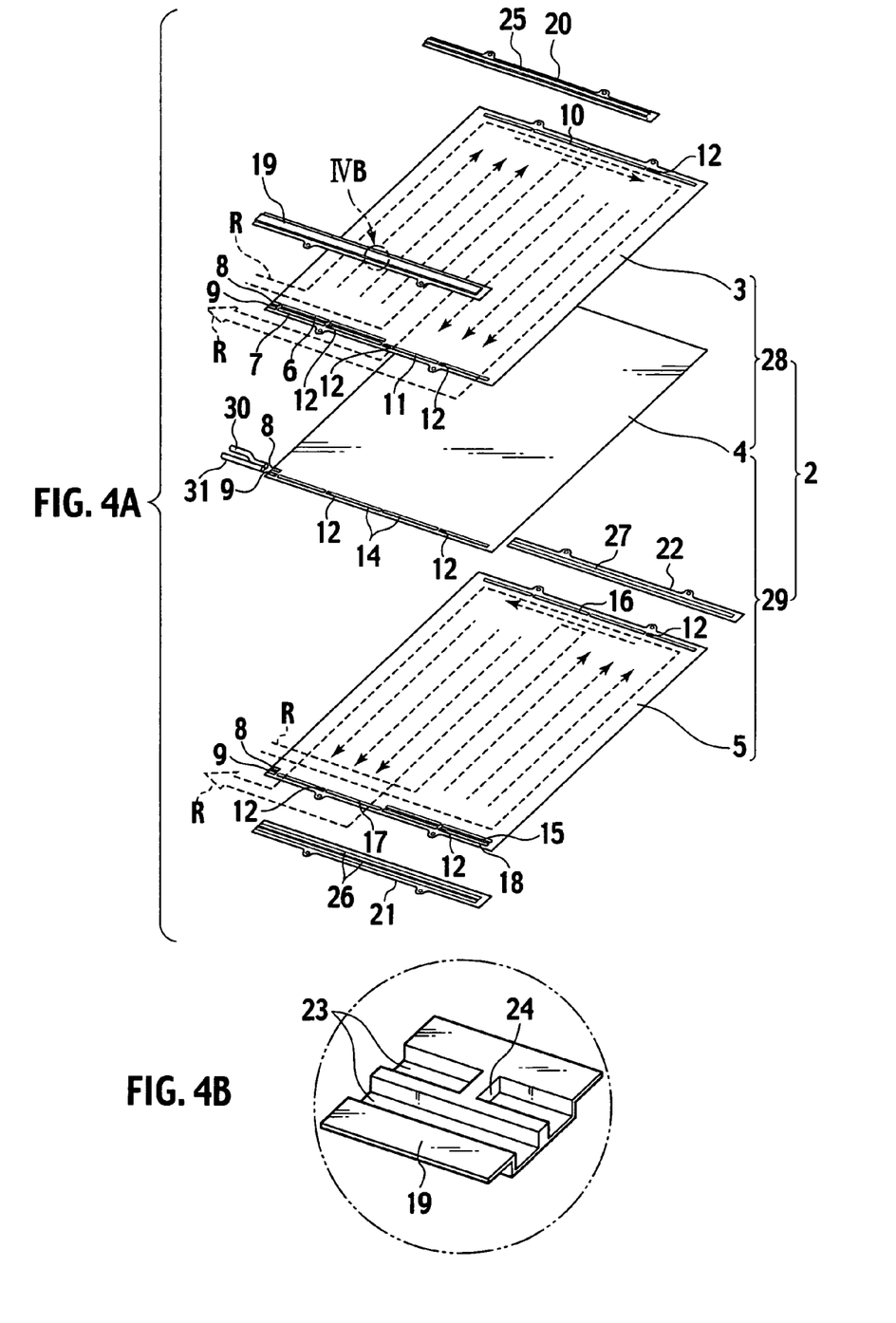
FIG. 4A is an exploded perspective view of the plate-like heat exchanger.
FIG. 4B is an enlarged rear view of an upper cover member of the plate-like heat exchanger, corresponding to a circle referred as IVB in FIG. 4A.

A pair of upper covering members 19 and 20 are joined on both the end margins of the upper plate body 3 respectively, on a face opposite to the face facing to the central plate body 4. The upper covering member 19 on a face facing to the upper plate body 3 has grooves 23, one of which is correspondent to the first crossing flow path 6 and another of which is correspondent to the auxiliary flow path 7 and the third crossing flow path 11. The former groove 23 has a partition 24 correspondent to an end of the first crossing flow path 6 as shown in FIG. 4B. The upper covering member 20 on a face facing to the upper plate body 3 has a groove 25 correspondent to the second crossing flow path 10.

A pair of lower covering members 21 and 22 are joined on both the end margins of the lower plate body 5 respectively, on a face opposite to the face facing to the central plate body 4. The lower covering member 21 on a face facing to the lower plate body 5 has grooves 26, one of which is correspondent to the fourth crossing flow path 15 and another of which is correspondent to the sixth crossing flow path 17 and the auxiliary flow path 18. The lower covering member 22 on a face facing to the lower plate body 5 has a groove 27 correspondent to the fifth crossing flow path 16.

The upper plate body 3, the central plate body 4, the lower plate body 5, the upper covering member 19 and 20 and the lower covering member 21 and 22 are accumulated in this order and positioned so that the correspondent elements are aligned with each other. Next these members are set in an appropriate joining apparatus (not shown), pressed and heated from the top and the bottom. Then the plate body bodies 3, 4 and 5 and the covering members 19, 20, 21 and 22 are joined with each other by diffusion bonding since these members are made of metal which is preferable to bringing about the diffusion bonding. Therefore production of the plate-like heat exchanger 2 is easy to be accomplished.

After joining, the upper plate body 3 and the center plate body 4 compose an upper plate-like structure 28. The flow paths 13 are formed in an interior of the upper plate-like structure 28 and run in the first direction A. The lower plate body 5 and the central plate body 4 compose a lower plate-like structure 29. The flow paths 13 are formed in an interior of the lower plate-like structure 29 and run in the first direction A. More specifically, two plate-like structure 28 and 29 are simultaneously formed in a back-to-back state by the upper plate body 3, the central plate body 4 and the lower plate body 5 in a state of using the central plate body 4 together.

The first crossing flow path 6, the second crossing flow path 10, the third crossing flow path 11, the fourth crossing flow path 15, the fifth crossing flow path 16, the sixth crossing flow path 17 and the auxiliary flow paths 7, 14 and 18 are defined by the upper covering members 19 and 20, the lower covering members 21 and 22 and the plate-like structures 28 and 29. Respectively to the inflow port 8 and the outflow port 9, an inflow pipe 30 and an outflow pipe 31 are inserted and brazed. Thereby the plate-like heat exchanger 2 is produced.

Figure 7:
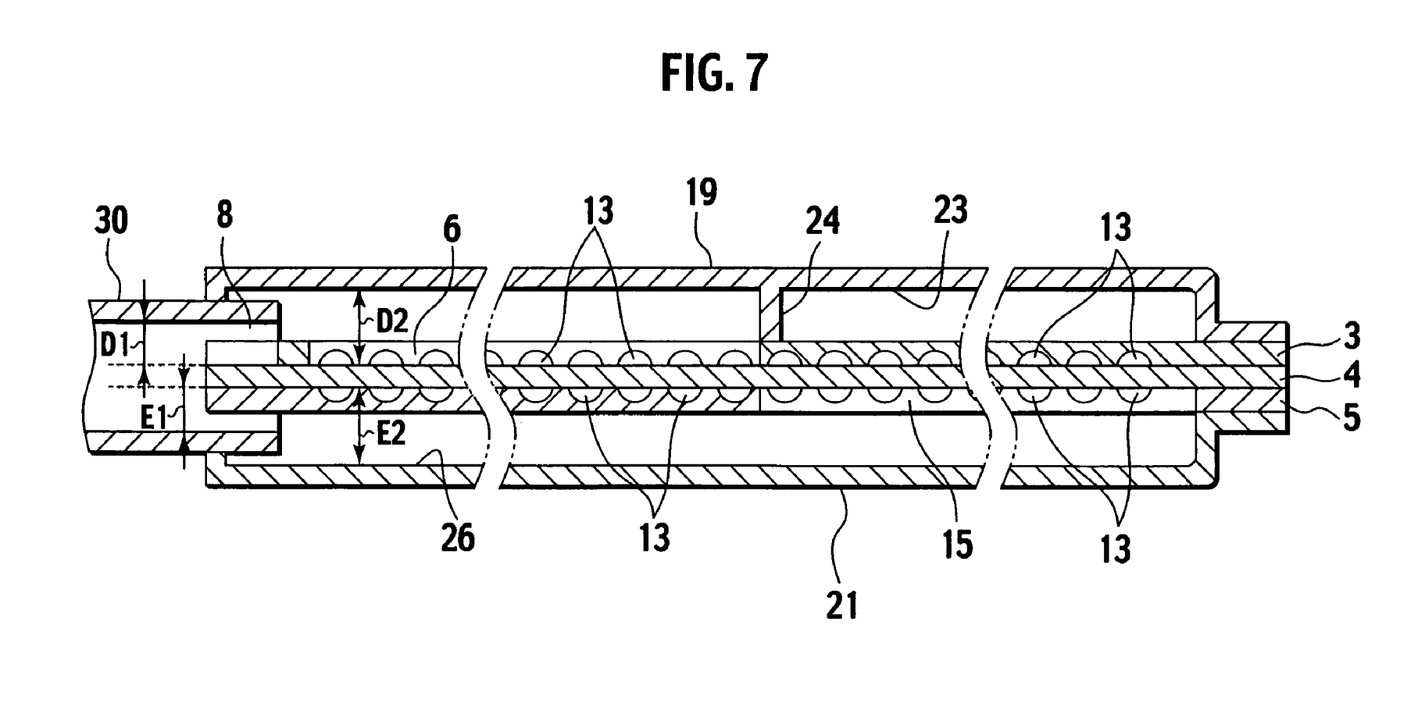
FIG. 7 is a cross sectional view taken along the VII-VII line of FIG. 3.

Reference is now made to FIG. 7. When the refrigerant fluid R flows into the inflow pipe 30, the refrigerant fluid R is branched to the upper plate-like structure 28 and the lower plate-like structure 29. Then, because the plate-like heat exchanger 2 is leveled horizontally, a gaseous fluid having a low density derived from the refrigerant fluid R flows through the upper plate-like structure 28 as a result of branching. As well, a liquid fluid having a high density derived from the refrigerant fluid R flows through the lower plate-like structure 29.

In a cross-sectional area of the inflow pipe 30, where the cross section is taken by a plane perpendicular to the flow of the fluid, a cross-sectional area D1 corresponding to the flow into the upper plate-like structure 28 is substantially equal to (or may be smaller than) a total cross-sectional area D2 of cross sections of the first crossing flow path 6 and the groove 23. Therefore increase in resistance against the flow is avoided and hence the refrigerant fluid R smoothly circulates to the flow path 13. The same applies to a cross-sectional area of cross sections of the flow paths defined by the second crossing flow path 10, the third crossing flow path 11 and the upper covering members 19 and 20.

The refrigerant fluid R flowing through the upper plate-like structure 28 next flows through the first crossing flow path 6 into the flow paths 13 linked with the first crossing flow path 6. Then, the partition 24 formed at a midway of the groove 23 of the upper covering member 19 prevents the refrigerant fluid R from flowing beyond the partition 24. Thereby, the gaseous refrigerant fluid R is prevented from stagnating in an innermost part.

The refrigerant fluid R flowing into the flow paths 13 further flows through the flow paths 13 and reaches the second crossing flow path 10 at the same half of the upper plate-like structure 28 as where the first crossing flow path 6 exists. The refrigerant fluid R further flows through the second crossing flow path 10 toward the remaining half and flows into the flow paths 13 at the remaining half. Then the refrigerant fluid R flows into the third crossing flow path 11 and flows through the auxiliary flow path 7. Finally, the refrigerant fluid R flows out of the outflow port 9.

On the other hand, flow of the refrigerant fluid R in the lower plate-like structure 29 is generally opposed to the flow in the upper plate-like structure 28. More specifically, the refrigerant fluid R flowing in to the in flow pipe 30 flows through the groove 26 of the lower covering member 21 and reaches the fourth crossing flow path 15, and then flows into the flow path 13.

In a cross-sectional area of the inflow pipe 30, a cross-sectional area E1 corresponding to the flow into the lower plate-like structure 29 is substantially equal to (or may be smaller than) a total cross-sectional area E2 of cross sections of the fourth crossing flow path 15 and the groove 26. Therefore increase in resistance against the flow is avoided and hence the refrigerant fluid R smoothly circulates to the flow path 13. The same applies to a cross-sectional area of cross sections of the flow paths defined by the fifth crossing flow path 16, the sixth crossing flow path 17 and the lower covering members 21 and 22.

The refrigerant fluid R flowing into the flow paths 13 further flows through the flow paths 13 and reaches the fifth crossing flow path 16 at the same half of the lower plate-like structure 29 as where the fourth crossing flow path 15 exists. The refrigerant fluid R further flows through the fifth crossing flow path 16 toward the remaining half and flows into the flow paths 13 at the remaining half. Then the refrigerant fluid R flows back to the sixth crossing flow path 17. The refrigerant fluid R next flows out of the outflow port 9. The refrigerant fluid R partly flows into the auxiliary flow path 19, however, no problem may be raised because the high-density liquid refrigerant fluid R is unlikely to stagnate in an innermost part.

In accordance with the present embodiment, as described above, the plate-like heat exchanger 2 may be constituted in a prominently thin shape because the thickness thereof is given by only the plate-like structures 28 and 29 and the covering members 19, 20, 21 and 22.

Moreover, the production of the plate-like heat exchanger 2 can be easily accomplished because the production requires no troublesome procedures except for accumulating and joining the plate-like structures 28 and 29 and the covering members 19, 20, 21 and 22.

Furthermore, because both the upper plate-like structure 28 and the lower plate-like structure 29 can conduct the refrigerant fluid R, a total flow rate of the refrigerant fluid R can be increased so that efficiency of exchanging heat can improved.

Moreover, the plate-like heat exchanger 2 is capable of distributing the refrigerant fluid R into the gaseous part and the liquid part and respectively conducting them through the upper plate-like structure 28 and the lower plate-like structure 29.

Provided that the gaseous part and the liquid part flow in a mixed state, the flow of the gaseous part having a low density tends to be biased in the vicinity of the inflow port 8 though the flow of the liquid part having a high density tends to flow apart from the inflow port 8. Such biased flows cause nonuniformity of temperature distribution. The plate-like heat exchanger 2 improves uniformity of temperature distribution because the gaseous part and the liquid part independently flow therethrough.

The invention may be alternatively embodied by modifying the aforementioned embodiment. For example, the plate-like structures 28 and 29 may be independently formed and used. The inflow port 8 and the outflow port 9 are unnecessary to be formed adjacent to each other. Further, the plate-like heat exchanger 2 may be used in an upright position instead of the horizontal position described above.

Although the invention has been described above by reference to certain embodiments of the invention, the invention is not limited to the embodiments described above. Modifications and variations of the embodiments described above will occur to those skilled in the art, in light of the above teachings.

This application claims priority from Japanese Patent Application 2004-319237, filed Nov. 2, 2004, which is incorporated herein by reference in its entirety.

What is claimed is:

1. A plate-like heat exchanger in which a fluid flows, the plate-like heat exchanger comprising:
   a plate-like structure;
   a plurality of flow paths respectively including opened ends, the flow paths being formed in an interior of the plate-like structure and running in a first direction;
   a plurality of covering members, each of the covering members having one or more grooves, the covering members being fixed to the plate-like structure, at least one end of the covering members extending to reach any one or more peripheries of the plate-like structure;
   a plurality of crossing flow paths defined by the grooves of the covering members and the plate-like structure, the crossing flow paths being directed to a second direction intersecting the first direction and respectively being linked with the opened ends of the flow paths so as to distribute the fluid to the flow paths to direct a plurality of parallel bidirectional flows respectively flowing in the flow paths; and
   inflow and outflow ports respectively for inflow and outflow of the fluid, the ports respectively being formed at the ends of the covering members at the peripheries of the plate-like structure and linked with the crossing flow paths,
   wherein the plate-like structure comprises three plate bodies accumulated with each other and the flow paths are formed between the plate bodies.

2. The plate-like heat exchanger of claim 1, wherein: the inflow port is linked with all the flow paths formed at the respective interfaces so that the fluid is branched to flow through all the flow paths.

3. The plate-like heat exchanger of claim 1, wherein: the plate bodies and the covering members are joined with each other by diffusion bonding.

4. The plate-like heat exchanger of claim 1, wherein: the crossing flow paths are formed to have a cross-sectional area greater than a cross-sectional area of the inflow port.

5. A plate-like heat exchanger comprising:
   a plate-like structure defined by a first end, a second end, a first side and a second side;
   a plurality of covering members fixed to the plate-like structure;
   a plurality of first flow paths and a plurality of second flow paths defined by the plate-like structure, each of the first flow paths and the second flow paths being directed from the first end toward the second end and including a first opened end toward the first end and a second opened end toward the second end;

a first crossing flow path defined by the covering members and the plate-like structure, the first crossing flow paths being directed to a second direction directed from the first side toward the second side and linking the first opened ends of the first flow paths;

a second crossing flow path defined by the covering members and the plate-like structure, the second crossing flow paths being directed to the second direction and linking the second opened ends of the first flow paths and the second flow paths;

a third crossing flow path defined by the covering members and the plate-like structure, the third crossing flow paths being directed to the second direction and linking the first opened ends of the second flow paths; and inflow and outflow ports respectively for inflow and outflow of a fluid, the ports respectively being formed at ends of the covering members at the first sides of the plate-like structure and respectively linked with the first crossing flow path and the third crossing flow path, wherein the plate-like structure includes two or more plate bodies accumulated with each other so as to define the first flow paths and the second flow paths among the plate bodies.

6. The plate-like heat exchanger of claim 5, wherein the crossing flow path are formed to have a cross-sectional area greater than a cross-sectional area of the inflow port.

* * * * *